United States Patent
Jan et al.

(10) Patent No.: US 9,672,048 B2
(45) Date of Patent: Jun. 6, 2017

(54) ELECTRONIC DEVICE AND METHOD FOR WAKING UP OPERATING SYSTEM THEREOF

(71) Applicant: Acer Incorporated, New Taipei (TW)

(72) Inventors: Ren-Jung Jan, New Taipei (TW); Yin-Hsong Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 113 days.

(21) Appl. No.: 14/697,636

(22) Filed: Apr. 28, 2015

(65) Prior Publication Data
US 2016/0085563 A1    Mar. 24, 2016

(30) Foreign Application Priority Data
Sep. 19, 2014 (TW) .............. 103132458 A (51) Int. Cl.
*G06F 9/00* (2006.01)
*G06F 9/24* (2006.01)
*G06F 9/44* (2006.01)
*G06F 1/24* (2006.01)

(52) U.S. Cl.
CPC .............. *G06F 9/4418* (2013.01); *G06F 1/24* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; G06F 9/44502; G06F 9/44508; G06F 1/24; G06F 9/44526; G06F 15/177; G06F 9/44514; G06F 9/44523; G06F 11/1417; G06F 9/44505; H04L 12/12; H04L 12/10
See application file for complete search history.

(56) References Cited

U.S. PATENT DOCUMENTS

| | | | | |
|---|---|---|---|---|
| 2006/0271798 A1* | 11/2006 | Tandon | .................. | G06F 1/3203 713/300 |
| 2011/0026062 A1* | 2/2011 | Takatani | .............. | G06F 11/0757 358/1.13 |
| 2014/0006827 A1* | 1/2014 | Seto | ...................... | G06F 1/3234 713/323 |
| 2014/0118765 A1* | 5/2014 | Yang | .................. | G03G 15/5004 358/1.13 |

(Continued)

FOREIGN PATENT DOCUMENTS

| | | |
|---|---|---|
| TW | 200506725 | 2/2005 |
| TW | 200920026 | 5/2009 |
| TW | 201329706 | 7/2013 |

*Primary Examiner* — Zahid Choudhury
(74) *Attorney, Agent, or Firm* — Jianq Chyun IP Office (57) ABSTRACT

An electronic device and method for operating system waking up thereof are provided. The electronic device includes a processing unit, a timer coupled to the processing unit and a basic input/output system unit (BIOS) coupled to the processing unit. When an operating system operated by the processing unit is in a sleep state and the processing unit receives a wake-up signal, the processing unit executes a wake-up procedure through the BIOS to switch the operating system from the sleep state to a work state, and also controls the timer to start a timing procedure. When the processing unit determines that a timing value of the timing procedure exceeds a threshold and the operating system fails to switch from the sleep state to the work state, the processing unit executes a reset procedure through the BIOS.

10 Claims, 5 Drawing Sheets

(56) References Cited

U.S. PATENT DOCUMENTS

| | | | | |
|---|---|---|---|---|
| 2014/0344604 A1* | 11/2014 | Paljug | .................. | G06F 1/3209 |
| | | | | 713/323 |
| 2014/0351617 A1* | 11/2014 | Connell | ............... | G06F 1/3265 |
| | | | | 713/323 |
| 2015/0160718 A1* | 6/2015 | Cui | ...................... | G06F 1/3203 |
| | | | | 713/320 |
| 2015/0323984 A1* | 11/2015 | Ganton | .................... | G06F 1/28 |
| | | | | 713/323 |
| 2016/0062442 A1* | 3/2016 | Burstein | .............. | G06F 1/3209 |
| | | | | 713/320 |

* cited by examiner

ELECTRONIC DEVICE AND METHOD FOR WAKING UP OPERATING SYSTEM THEREOF

CROSS-REFERENCE TO RELATED APPLICATION

This application claims the priority benefit of Taiwan application serial no. 103132458, filed on Sep. 19, 2014. The entirety of the above-mentioned patent application is hereby incorporated by reference herein and made a part of this specification.

BACKGROUND

Technical Field

The invention relates to an electronic apparatus, and particularly relates to an electronic apparatus and a method for waking up operating system thereof.

Related Art

Generally, an electronic apparatus such as a desktop computer, a notebook computer, etc. is generally set to enter a sleep state when an idle time thereof is excessively long, so as to achieve a power-saving effect. However, when a user wants to log in or access the electronic apparatus in the sleep state in a remote way through an Internet connection, the electronic apparatus has to be waken up through a wake-on-LAN (WoL) mechanism, such that the user can get control of the electronic apparatus or access data of the electronic apparatus.

However, in some cases, the electronic apparatus may have an unexpected error when it is waken up from the sleep state to a general work state, such that the electronic apparatus cannot normally return to the general work state, and the user connected to the electronic apparatus from the remote through the Internet probably cannot get the required data in time or cannot perform necessary operations, which may cause considerable trouble and incalculable loss to the user.

SUMMARY

The invention is directed to an electronic apparatus and a method for waking up operating system thereof, which ensures the electronic apparatus to successfully return to a normal work state when the electronic apparatus is waken up from a sleep state.

The invention provides an electronic apparatus including a processing unit executing an operating system, a timer coupled to the processing unit, and a basic input/output system unit coupled to the processing unit. When the operating system executed by the processing unit is in a sleep state, and the processing unit receives a wake-up signal, the processing unit executes a wake-up procedure through the basic input/output system unit to switch the operating system from the sleep state to a work state, and the processing unit controls the timer to start a first timing procedure. When the processing unit determines that a timing value of the first timing procedure exceeds a first time threshold and the operating system fails to switch from the sleep state to the work state, the processing unit executes a reset procedure through the basic input/output system unit.

The invention provides a method for waking up operating system, which is adapted to an electronic apparatus executing an operating system, and the method includes following steps. First, when the operating system is in a sleep state, and a wake-up signal is received, a wake-up procedure is executed to switch the operating system from the sleep state to a work state, and a first timing procedure is started. Then, when it is determined that a timing value of the first timing procedure exceeds a first time threshold, and the operating system fails to switch from the sleep state to the work state, a reset procedure is executed.

According to the above descriptions, the invention provides an electronic apparatus and a method for waking up operating system thereof, which is capable of executing one or multiple reset procedures to ensure the operating system successfully entering the work state when the operating system is failed to be waken up.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
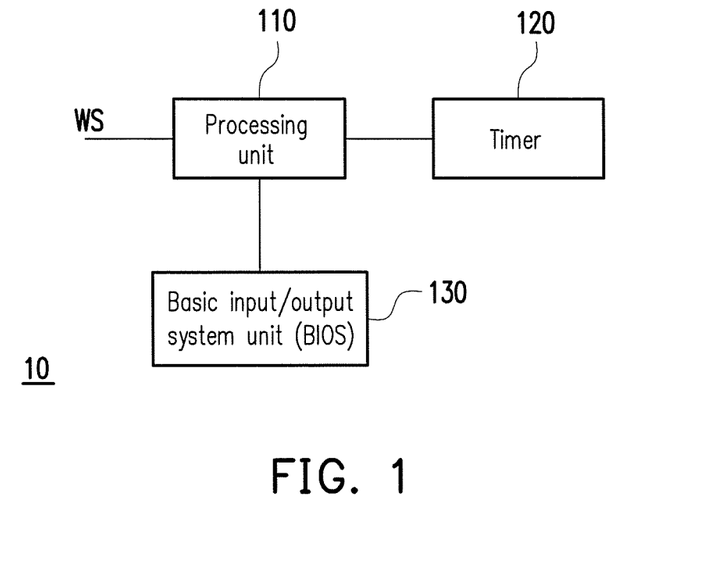
FIG. 1 is a block diagram of an electronic apparatus according to an embodiment of the invention.

FIG. 1 is a block diagram of an electronic apparatus according to an embodiment of the invention. Referring to FIG. 1, the electronic apparatus 10 includes a processing unit 110, a timer 120 and a basic input/output system unit (BIOS) 130. The processing unit 110 is configured to execute an operating system, and the timer 120 and the BIOS 130 are coupled to the processing unit 110. The electronic apparatus 10 can be an electronic device that has an operating system, e.g., desktop personal computer (PC), a notebook computer, a smart phone, etc. The operating system could be a general purpose operating system or a special purpose embedded operating system. A user can use the operating system executed by the processing unit 110 of the electronic apparatus 10 and a user interface thereof (for example, a display unit and an input output unit (not shown) of the electronic apparatus 10) to implement various usage demands of the user.

The operating system includes at least two work modes, a work state and a sleep state, which respectively correspond to two operation states of the processing unit 110 with a higher power consumption and a lower power consumption. For example, the work state can be a S0 state defined in advanced configuration and power interface (ACPI), and the sleep state can be a S3 state or a S4 state defined in the ACPI, though the invention is not limited thereto.

When the operating system executed by the processing unit 110 is in the sleep state, and the processing unit 110 receives a wake-up signal WS, the processing unit 110 executes a wake-up procedure through the BIOS 130 to switch the operating system from the sleep state to the work state, and the processing unit 110 controls the timer 120 to start a first timing procedure. When the processing unit 110 determines that a timing value of the first timing procedure exceeds a first time threshold and the operating system fails to switch from the sleep state to the work state, the processing unit 110 executes a reset procedure through the BIOS 130. In detail, the processing unit 110 extracts a program code (for example, a first program code) corresponding to the wake-up procedure in the BIOS 130, and executes the program code to wake up the operating system, or extracts a program code (for example, a second program code) corresponding to the reset procedure in the BIOS 130, and executes the program code to reset the operating system.

Figure 2:
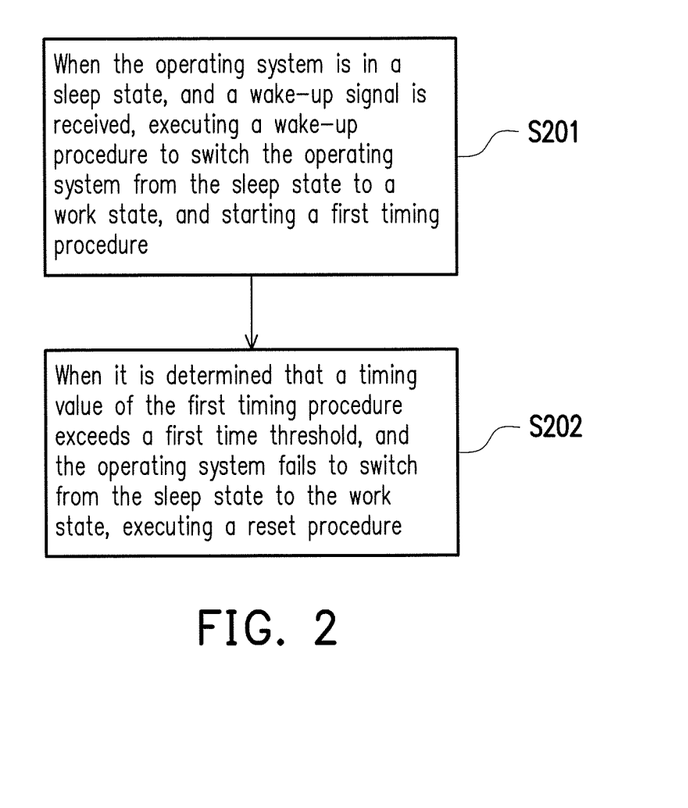
FIG. 2 is a flowchart illustrating a method for waking up operating system according to an embodiment of the invention.

FIG. 2 is a flowchart illustrating a method for waking up operating system according to an embodiment of the invention. The method for waking up operating system of FIG. 2 is adapted to an electronic apparatus having an operating system, for example, the electronic apparatus 10 of FIG. 1. Referring to FIG. 2, in step S201, when the operating system is in a sleep state, and a wake-up signal is received, a wake-up procedure is executed to switch the operating system from the sleep state to a work state, and a first timing procedure is started. Then, in step S202, when it is determined that a timing value of the first timing procedure exceeds a first time threshold, and the operating system fails to switch from the sleep state to the work state, a reset procedure is executed.

In brief, in the embodiment of FIG. 1 and FIG. 2, the processing unit 110 starts timing (i.e. performs the first timing procedure) while switching the operating system from the sleep state to the work state. If the timing value exceeds a first time threshold and the operating system fails to enter the work state, it represents that the operating system has an unexpected error in the aforementioned state switching process, and now the processing unit 110 executes a reset procedure of the operating system, such that the operating system can re-enter the work state through a booting procedure. The reset procedure can be a soft reset/software reset procedure or a hard reset/hardware reset procedure of the operating system, which respectively correspond to the reset procedure performed when the user presses a reboot button in the user interface of the operating system and the reset procedure performed when the user presses a physical key (not shown in FIG. 1) on the electronic apparatus 10 corresponding to a reboot function, though the invention is not limited thereto. Technical features of the invention are described in detail below with reference of embodiments and figures.

Figure 3:
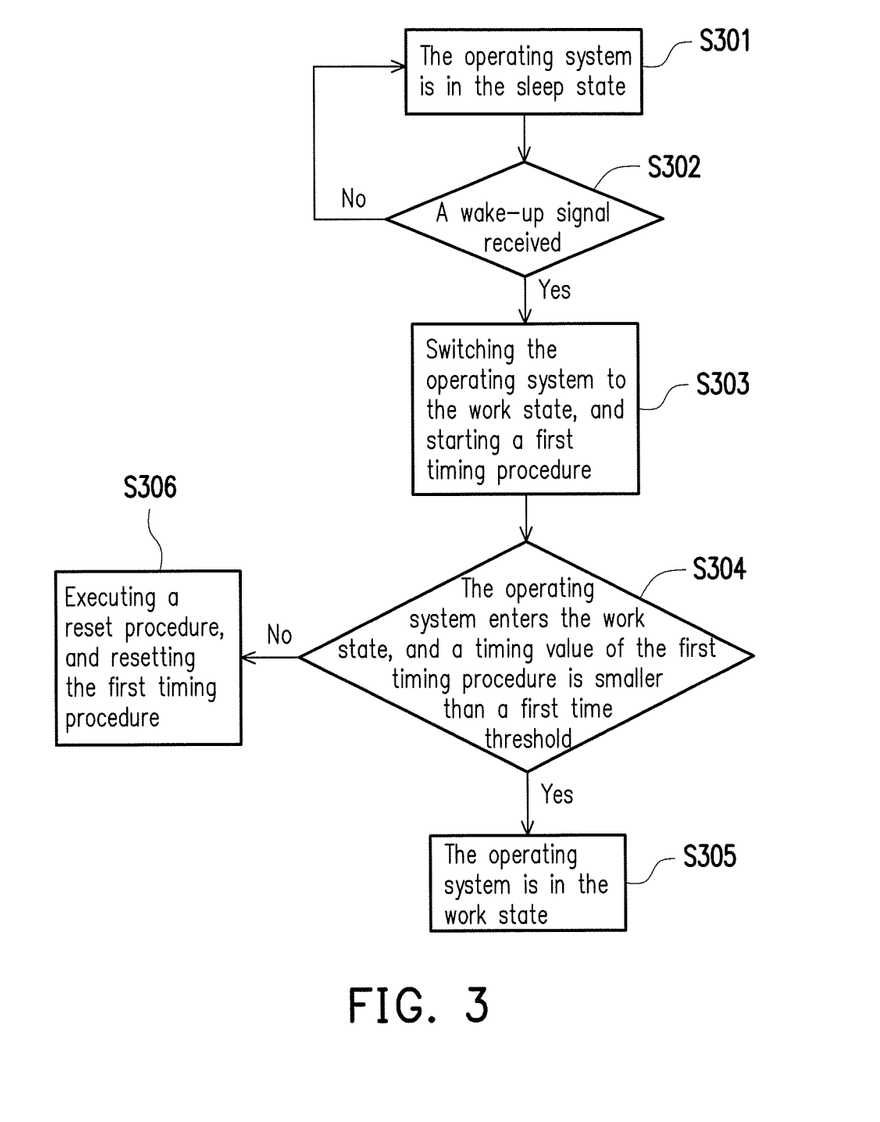
FIG. 3 is a flowchart illustrating a method for waking up operating system according to an embodiment of the invention.

FIG. 3 is a flowchart illustrating a method for waking up operating system according to an embodiment of the invention. Compared to the embodiment of FIG. 2, the embodiment of FIG. 3 provides a detailed implementation. Referring to FIG. 1 and FIG. 3, the operating system executed by the processing unit 110 can enter the sleep state through user's operation or a mechanism of excessive idle time (step S301), and when the operating system is in the sleep state, the processing unit 110 keeps determining whether the wake-up signal WS is received (step S302). When the processing unit 110 determines that the wake-up signal WS is received (step S302, yes), the processing unit 110 switches the operating system to the work state, and starts the first timing procedure (step S303).

Then, the processing unit 110 determines whether the operating system is successfully switched to the work state within a time interval that the timing value of the first timing procedure is smaller than the first time threshold (step S304). When the processing unit 110 determines that the operating system enters the work state, and meanwhile the timing value of the first timing procedure is smaller than the first time threshold, it represents that the operating system has been successfully switched to the work state, and the processing unit 110 continuously executes the operating system in the work state (step S305). When the processing unit 110 determines that the timing value of the first timing procedure is greater than the first time threshold (e.g., 10~30 seconds), and the operating system does not enter the work state (step S304, no), the processing unit 110 executes the reset procedure to the operating system, and resets the first timing procedure to zero for re-timing (step S306). Namely, before the operating system enters the work state, the processing unit 110 takes the first time threshold as a time unit to continuously try to reset the operating system until the operating system successfully enters the work state.

Figure 4:
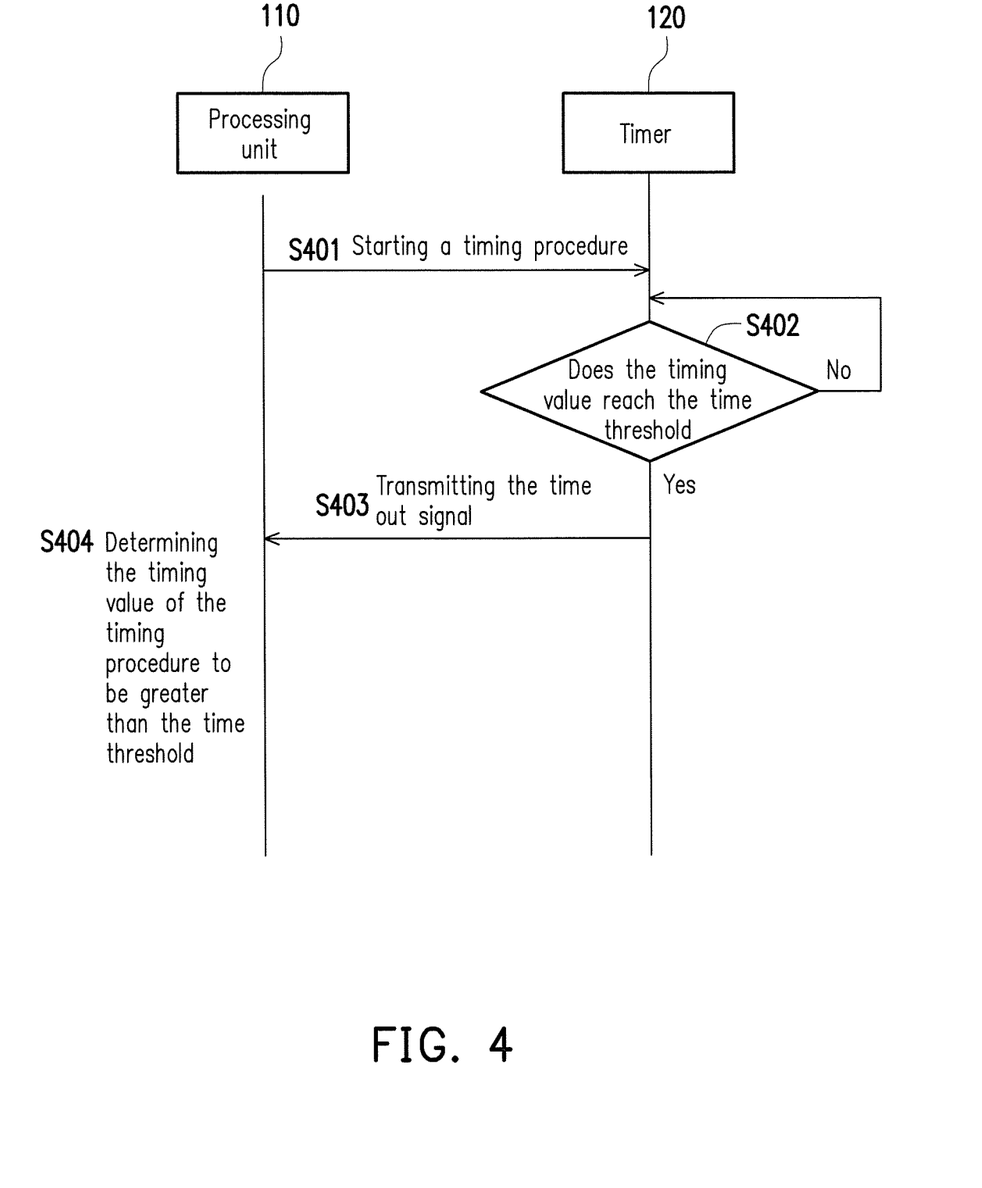
FIG. 4 is a timing flowchart of a timing procedure executed by a processing unit and a timer in the electronic apparatus according to an embodiment of the invention.

In an embodiment of the invention, when the processing unit 110 executes the timing procedure (for example, the first timing procedure), the processing unit 110 itself does not execute the timing operation, but controls the timer 120 to execute the timing operation of the timing procedure. The timer 120 can be independently disposed in the electronic apparatus 10, or can be packaged into a same chip with the processing unit 110. FIG. 4 is a timing flowchart of the timing procedure executed by the processing unit and the timer in the electronic apparatus according to an embodiment of the invention. Referring to FIG. 4, first, the processing unit 110 transmits a control signal to the timer 120 to start the timing procedure (step S401), where the control signal may include a time threshold. Then, the timer 120 starts the timing procedure after receiving the control signal corresponding to the timing procedure, and keeps determining whether the timing value of the timing procedure reaches the aforementioned time threshold (step S402). When the timing value reaches the time threshold, the timer 120 sends a time out signal to the processing unit 110. The processing unit 110 receives the time out signal, and determines that the timing value of the timing procedure is greater than (or reaches) the time threshold.

It should be noticed that the timer 120 can be a real time clock (RTC), which is, for example, implemented by a complementary metal-oxide-semiconductor (CMOS). Other timing procedures mentioned in the invention can be implemented according to a flow similar to the flow of FIG. 4, though the invention is not limited thereto.

On the other hand, the wake-up signal WS mentioned in the embodiments of FIG. 1 to FIG. 3 can be obtained by analyzing a signal/operation received from external of the electronic apparatus 10. For example, the wake-up signal WS can be a wake-up signal of a wake-on-LAN (WoL) mechanism. The processing unit 110 can receive a network packet transmitted from the Internet through a network unit (not shown) of the electronic apparatus 10, and the processing unit 110 further analyzes the network packet to obtain the wake-up signal WS. Alternatively, the wake-up signal WS can be generated through an operation of the user on an input output unit (not shown, for example, a keyboard, a mouse, a touch panel, etc.) of the electronic apparatus 10. Moreover, in an embodiment of the invention, the electronic apparatus 10 is periodically switched between the work state and the sleep state. In the this embodiment, when the operating system enters the sleep state, the processing unit 110 starts a second timing procedure, and when a timing value of the second timing procedure is greater than a second time threshold, the processing unit 110 switches the operating system from the sleep state to the work state. Therefore, regarding implementation of the timing procedure of the embodiment of FIG. 4, in the this embodiment, the time out signal transmitted to the processing unit 110 by the timer 120 would also be regarded as the wake-up signal WS.

Figure 5A:
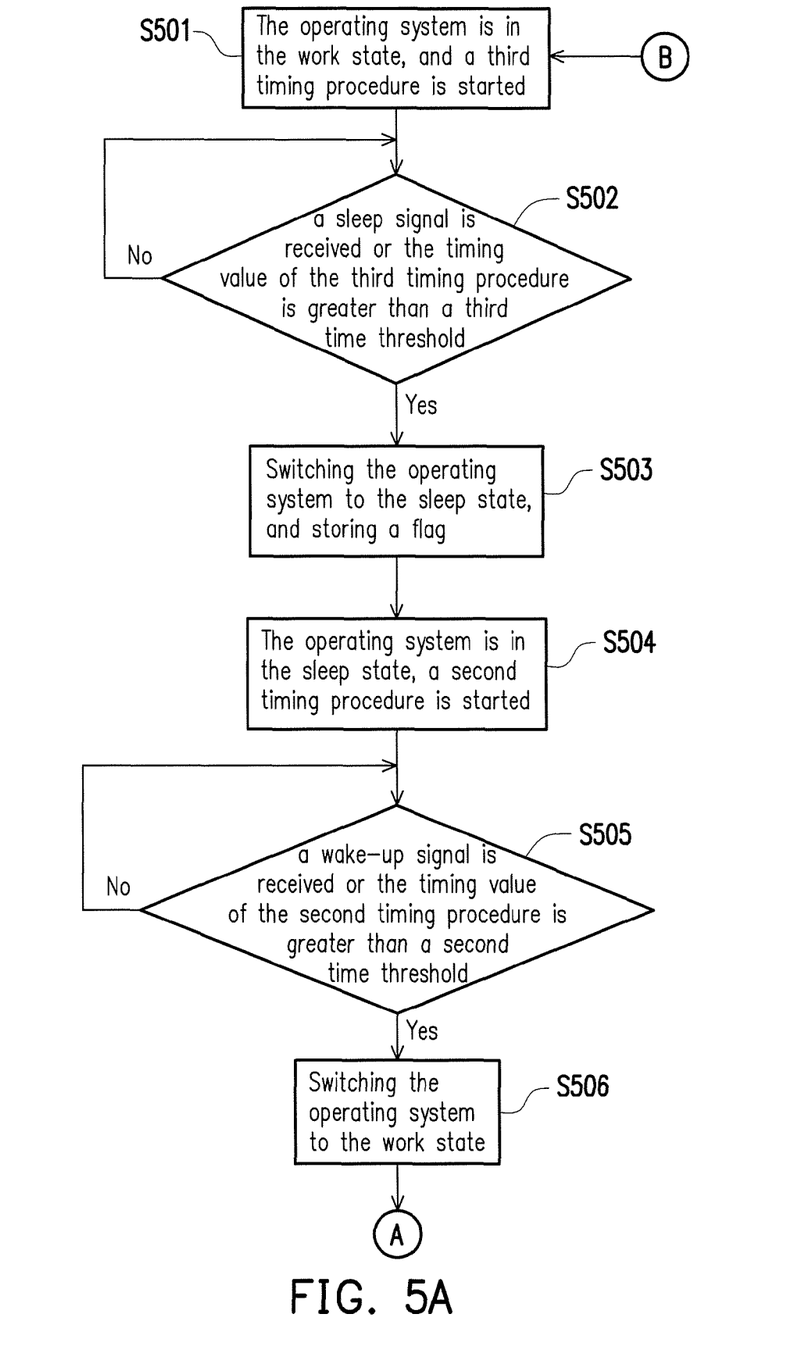
FIG. 5A and FIG. 5B are flowcharts illustrating a method for waking up operating system according to an embodiment of the invention.
Figure 5B:
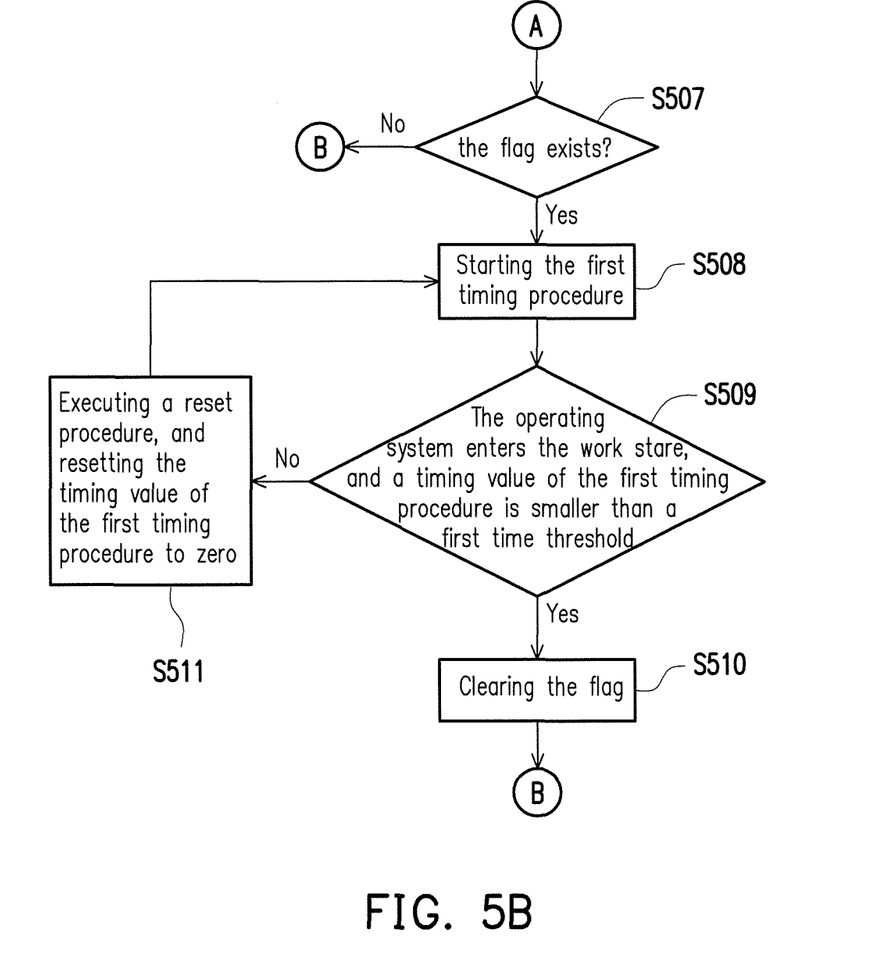

FIG. 5A and FIG. 5B are flowcharts illustrating a method for waking up operating system according to an embodiment of the invention. In the present embodiment, the electronic apparatus 10 is periodically switched between the work state and the sleep state. When the user is away from the electronic apparatus 10, and sets the electronic apparatus 10 a cloud data center for login remotely, the electronic apparatus 10 can be configured as follows.

Referring to FIG. 1 and FIG. 5A, first, when the operating system enters and is in the work state, for example, the operating system is recovered from the sleep state, or the booting procedure or the reset procedure of the operating system is just completed, the processing unit 110 starts a third timing procedure (step S501) to calculate a time that the processing unit 110 is in the work state. When the processing unit 110 receive a sleep signal (for example, through user's operation) or a timing value of the third timing procedure is greater than a third time threshold (step S502, yes), the processing unit 110 switches the operating system to the sleep state, and stores a flag in a storage unit of the electronic apparatus 10, where the storage unit is a non-volatile memory, which can be a memory configured in the processing unit, a memory packaged in a same chip with the processing unit, or a memory unit independently disposed in the electronic apparatus 10, for example, a hard disc, a solid state disc, etc., which is not limited by the invention.

Then, after the operating system enters the sleep state, the processing unit 110 further starts the second timing procedure (step S504). When the operating system is in the sleep state, the processing unit 110 keeps determining whether a wake-up signal is received (for example, through a network unit, or through user's operation), or whether the timing value of the second timing procedure is greater than the second time threshold, i.e., whether the time out signal (which could be equivalent to the wake-up signal) is received from the timer 120. When the processing unit 110 determines that the wake-up signal is received, or the timing value of the second timing procedure is greater than the second time threshold, the processing unit 110 switches the operating system to the work state (step S506).

Referring to FIG. 1 and FIG. 5B, while the processing unit 110 switches the operating system to the work state, the processing unit 110 determines whether the storage unit includes the flag (step S507). If yes, the processing unit 110 starts the first timing procedure (step S508), and determines whether the operating system successfully enters the work state before the timing value of the first timing procedure reaches the first time threshold (step S509). If the processing unit 110 determines that the operating system successfully enters the work state before the timing value of the first timing procedure reaches the first time threshold, the processing unit 110 clears the flag in the storage unit (step S510), and makes the operating system to be in the work state, and once again starts the third timing procedure (step S501). If the operating system fails to enter the work state before the timing value of the first timing procedure reaches the first time threshold (step S509, no), the processing unit 110 executes the reset procedure to the operating system, resets the timing value of the first timing procedure to zero, and continuously determines whether the operating system successfully enters the work state before the timing value of the first timing procedure reaches the first time threshold after the reset procedure of the operating system is performed (step S509), until the operating system successfully enters the work state.

Here, a function of the flag is to distinguish whether the operating system is currently in a normal rebooting procedure of a normal reset procedure or in a reset procedure executed due to the un-successful waken-up procedure of the operating system (as shown in FIG. 5A and FIG. 5B). If the flag is not set in the embodiment shown in FIG. 5A and FIG. 5B, the electronic apparatus 10 may probably start the first timing procedure every time the reset procedure is being executed, and the reset procedure may be executed repeatedly, such that the electronic apparatus 10 cannot be normally used by the user.

In summary, the invention provides an electronic apparatus and a method for waking up operating system thereof, which ensures the electronic apparatus to successfully enter the work state when the operating system is waken up from the sleep state. For example, when the user is away from the electronic apparatus, and is connected to the electronic apparatus through remote login or a cloud accessing manner through the Internet, the operating system executed by the electronic apparatus can return back to the work state from the sleep state, so as to provide the user required data or execute necessary operations. If the operating system has an unexpected error during the wake-up process, and the operating system fails to enter the work state, the user cannot connect the electronic apparatus through the Internet to implement operation control. In this case, the user cannot connect the electronic apparatus and access data therein by any other means, which may cause a considerable trouble in utilization or even cause money and time loss of the user. By using the electronic apparatus and the method for waking up operating system thereof of the invention, the above problem is successfully resolved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic apparatus, comprising:
   a processing unit, executing an operating system;
   a timer, coupled to the processing unit; and
   a basic input/output system unit, coupled to the processing unit,
   wherein when the operating system executed by the processing unit is in a work state, and a sleep signal is received, the processing unit stores a flag to a storage unit, and controls the operating system to enter a sleep state,
   wherein when the operating system executed by the processing unit is in the sleep state, and the processing unit receives a wake-up signal, the processing unit extracts a first program code from the basic input/output system unit to execute a wake-up procedure to switch the operating system from the sleep state to the work state, wherein when the processing unit executes the wake-up procedure through the basic input/output system unit and determines that the storage unit stores the flag, the processing unit controls the timer to start a first timing procedure during the wake-up procedure, wherein when the processing unit determines that a timing value of the first timing procedure exceeds a first time threshold and the operating system fails to switch from the sleep state to the work state, the processing unit executes a reset procedure through the basic input/output system unit, wherein when the processing unit determines that the timing value of the first timing procedure does not exceeds the first time threshold and the operating system successfully switches from the sleep state to the work state, the processing unit clears the flag stored in the storage unit.

2. The electronic apparatus as claimed in claim 1, wherein the wake-up signal is a time out signal, wherein when the operating system is in the sleep state, the processing unit controls the timer to start a second timing procedure, when a timing value of the second timing procedure is greater than a second time threshold, the timer transmits the time out signal to the processing unit.

3. The electronic apparatus as claimed in claim 1, further comprising:

a network unit, coupled to the processing unit, wherein the processing unit receives a network packet through the network unit, and analyzes the network packet to obtain the wake-up signal.

4. The electronic apparatus as claimed in claim 1, wherein when the operating system is in the work state, the processing unit controls the timer to start a third timing procedure, when the processing unit determines that a timing value of the third timing procedure exceeds a third time threshold, the processing unit switches the operating system to the sleep state.

5. The electronic apparatus as claimed in claim 1, wherein the sleep state is a S3 state or a S4 state in an advanced configuration and power interface (ACPI); and the work state is a S0 state in the ACPI.

6. A method for waking up operating system, adapted to an electronic apparatus executing an operating system, and comprising:

storing a flag to a storage unit, and controlling the operating system to enter a sleep state when the operating system is in a work state and a sleep signal is received;

executing a wake-up procedure to switch the operating system from the sleep state to the work state when the operating system is in the sleep state and a wake-up signal is received;

starting a first timing procedure when it is determined that the wake-up procedure is executed and the flag is stored in the storage unit;

executing a reset procedure when it is determined that a timing value of the first timing procedure exceeds a first time threshold and the operating system fails to switch from the sleep state to the work state; and clearing the flag stored in the storage unit when it is determined that the timing value of the first timing procedure does not exceed the first time threshold and the operating system successfully switches from the sleep state to the work state.

7. The method for waking up operating system as claimed in claim 6, wherein when the wake-up signal is a time out signal and before the step of executing the wake-up procedure to switch the operating system from the sleep state to the work state, the method further comprises:

controlling the timer to start a second timing procedure when the operating system is in the sleep state; and transmitting the time out signal when a timing value of the second timing procedure is greater than a second time threshold.

8. The method for waking up operating system as claimed in claim 6, wherein before the step of executing the wake-up procedure to switch the operating system from the sleep state to the work state, the method further comprises:

receiving a network packet, and analyzing the network packet to obtain the wake-up signal.

9. The method for waking up operating system as claimed in claim 6, further comprising:

starting a third timing procedure when the operating system is in the work state; and switching the operating system to the sleep state when it is determined that a timing value of the third timing procedure exceeds a third time threshold.

10. The method for waking up operating system as claimed in claim 6, wherein the sleep state is a S3 state or a S4 state in an advanced configuration and power interface (ACPI); and the work state is a S0 state in the ACPI.

* * * * *